A. C. PRATT.
GROMMET OR CORE FOR TIRE BEADS.
APPLICATION FILED MAR. 25, 1919.
1,437,013.
Patented Nov. 28, 1922.
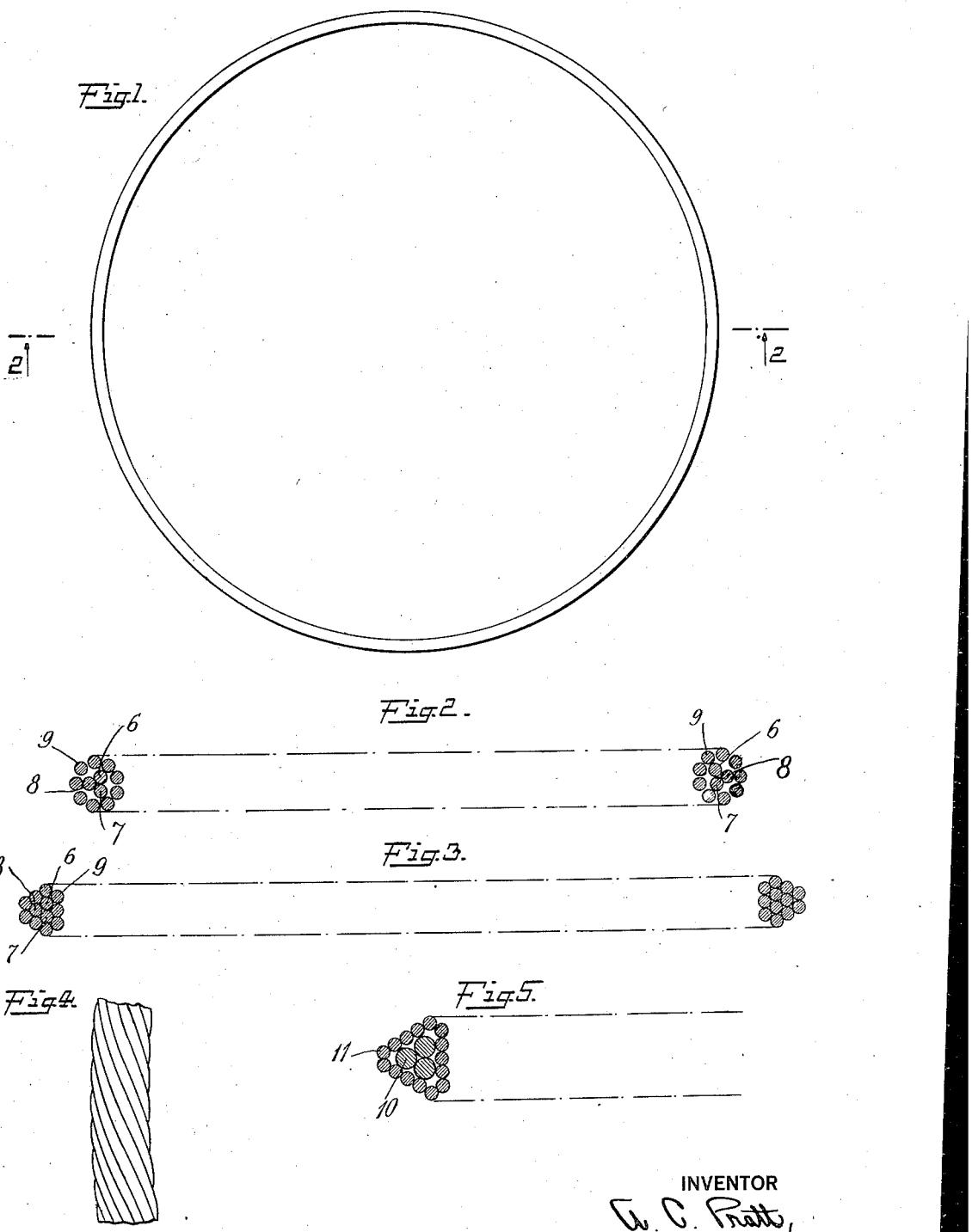

Patented Nov. 28, 1922.

1,437,013

UNITED STATES PATENT OFFICE.

ALPHONSO COMSTOCK PRATT, OF DEEP RIVER, CONNECTICUT, ASSIGNOR TO INTERNATIONAL BEAD WIRE COMPANY, A CORPORATION OF DELAWARE.

GROMMET OR CORE FOR TIRE BEADS.

Application filed March 25, 1919. Serial No. 285,123.

*To all whom it may concern:*

Be it known that I, ALPHONSO COMSTOCK PRATT, a citizen of the United States, residing at Deep River, in the county of Middlesex, State of Connecticut, have invented certain new and useful Improvements in Grommets or Cores for Tire Beads; and I do hereby declare the following to be a full, clear, and exact description of the invention, such as will enable others skilled in the art to which it appertains to make and use the same.

This invention relates to grommets or cores for tire beads for use in the manufacture of shoes or casings for pneumatic tires, particularly those of the "straight side" type. The invention is directed to the provision of a grommet of an improved construction which may be manufactured at relatively low cost and with substantial uniformity, which possesses to a marked degree the strength which is so desirable in a grommet for an automobile tire, and which has a cross-sectional shape which is of special utility.

The construction commonly employed for grommets or cores for tire beads is one which includes a core and a plurality of convolutions of wire wound spirally upon this core. Usually the core consists of a hoop made from a single strand of wire which is bent to a circular form and then has its ends united in any suitable manner as by welding them together. In some instances the core has been made up from a plurality of strands of wire, the several strands lying side by side.

In accordance with the present invention, the core for the grommet consists of three convolutions of wire laid side by side in such a relation as to form a triangular cross-section, the arrangement being such that two of the convolutions lie side by side and the third lies on the outer side of these two convolutions directly over their adjacent sides. The core so formed is of triangular cross-section with one of its sides toward the inner side of the core and the inner side of the completed grommet and the apex of the triangle toward the outer side of the grommet.

A plurality of convolutions of spirals are wound upon the core so formed with the spirals of the several convolutions lying side by side and forming a complete layer or casing. The surrounding layer or layers of convolutions of spirals may be applied to the core in any suitable manner and the end or the ends thereof may be secured in position in any suitable manner.

After the grommet has been so formed, it is preferably stretched to enlarge it to the precise diameter desired for the completed grommet. During this process of expanding the grommet to the desired size, the surrounding casing or casings of spirally formed wires, which initially had a configuration approximating a circle in cross-section, assume relative positions determined by the cross-sectional shape of the enclosed core, that is, a shape approximating a triangle having one of its sides toward the center of the grommet and its apex directed outwardly. This form of grommet is especially desirable for use in casings for automobile tires, particularly tires for heavy vehicles such as trucks.

In the accompanying drawings, Fig. 1 is an elevation of a grommet; Fig. 2 is a cross-section of a grommet embodying the present invention prior to being expanded; Fig. 3 is a view similar to Fig. 2 showing the grommet after it has been expanded; Fig. 4 is an enlarged view of a portion of the grommet; and Fig. 5 is a sectional detail view illustrating a modification of the construction shown in the other figures.

Referring to these drawings, the grommet shown consists of a core and a single layer of spirals enclosing this core. The core consists of three convolutions of wire. These three convolutions are designated 6, 7 and 8 on Fig. 2. It will be noted that the convolutions 6 and 7 lie side by side and toward the center of the grommet while the convolution 8 lies on the outer side of the convolutions 6 and 7 over the adjacent sides of those convolutions. The three convolutions thus arranged form a core which is of triangular cross-section. The three convolutions 6, 7 and 8 are preferably formed from a continuous piece of wire which may be integral with or separate from the wire forming the superimposed layer or layers of spirals. If the wire from which the convolutions of the core are formed is separate from the overlying casing of spirals, the ends of this piece of wire may be joined if desired, as by welding them together.

After the core has been formed as above described, the layer of spirals is applied to it as shown at 9. For this purpose wire is wound spirally upon the core, a plurality of convolutions of the winding being employed and the spirals of the several convolutions lying side by side upon the surface of the core. This may be done in any suitable manner, the wire of the surrounding casing being given its spiral form either as an incident to applying it to the core or previous to the application of the wire to the core. The end of the wire forming the surrounding casing of spirals may be secured in position in any suitable manner.

When this surrounding casing of spirally formed wire has been completed, the grommet is in substantially the form indicated in Fig. 2, the spirals of the casing being arranged approximately in a circle about the triangular core.

The grommet so formed is then subjected to heavy pressure to expand it to the desired size. While so expanding the grommet, the casing of spirals assumes a configuration more or less approximating the cross-sectional shape of the core so that the completed grommet is substantially triangular in cross-section. The relation of the core wires and the wires of the spiral casing after the grommet has been so expanded, is indicated in Fig. 3.

It will be noted that the wire of all of the convolutions is shown as of the same diameter. If desired, however, the core and the casing may be formed from separate pieces of wire; where greater strength is desired, the core may be formed from a separate piece of wire which is of larger cross-section than the wire for the spiral casing. Such a construction is illustrated in Fig. 5 wherein the core wires 10 are of considerably greater diameter than the casing wires 11.

What I claim is:

1. A grommet having a core and a casing on the core consisting of a plurality of convolutions of spirals with the spirals of the several convolutions lying side by side, the said core consisting of three convolutions of wire lying side by side to form a core of triangular cross-section.

2. A grommet having a core consisting of three wires arranged in the form of a triangle and a casing on the core consisting of a plurality of convolutions of spirals with the spirals of the several convolutions lying side by side.

3. A circular grommet having a core consisting of three convolutions of wire laid together so that each contacts with the other two to form a core which is substantially triangular in cross-section and a casing on the core consisting of a plurality of convolutions of spirals with the spirals of the several convolutions lying side by side, the grommet being substantially triangular in cross-section and having one of the sides of the triangle toward the center of the circle of the grommet and the apex of the triangle opposite that side directed away from that center.

4. A circular grommet formed from a continuous piece of wire and consisting of a core formed of a plurality of convolutions of substantially straight lengths of wire lying side by side and a casing on the core formed from a plurality of convolutions of spirals with the spirals of the several convolutions lying side by side and encircling the core, the grommet being substantially triangular in cross-section and having one of the sides of the triangle toward the center of the circle of the grommet and the apex of the triangle opposite that side directed away from that center.

5. A circular grommet formed from a continuous piece of wire and consisting of a core formed from three convolutions of the wire and a casing formed from a plurality of convolutions of spirals of the wire with the spirals of the several convolutions lying side by side, the three convolutions constituting the core being arranged in the form of a triangle and the completed grommet being of triangular cross-section with one of the sides of the triangle toward the center of the circle of the grommet and the apex of the triangle directed away from that center.

In testimony whereof I affix my signature.

ALPHONSO COMSTOCK PRATT.